Feb. 28, 1928.
H. G. SHORTT
STEAM TRAP
Filed May 10, 1927
1,660,428
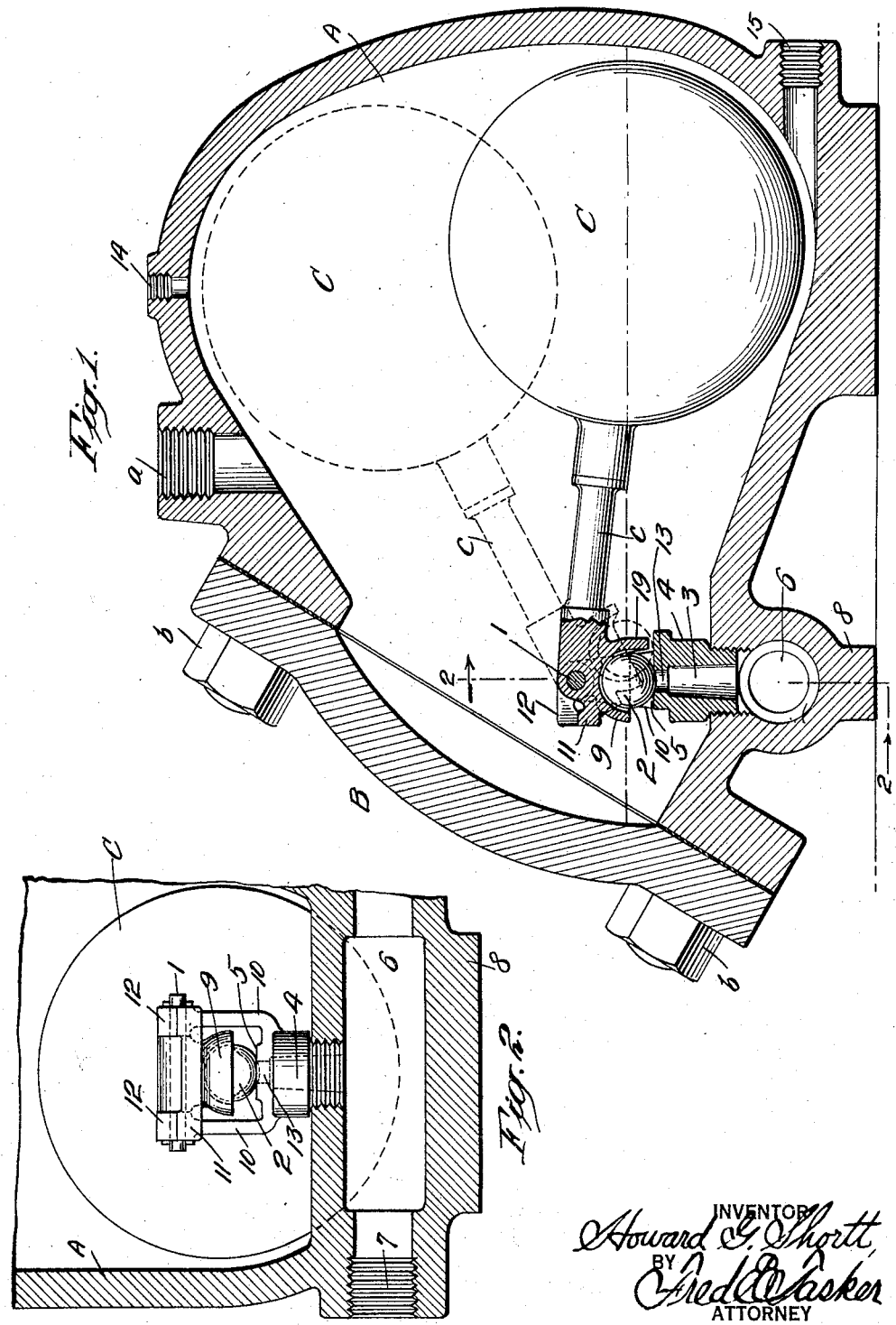

Patented Feb. 28, 1928.

1,660,428

UNITED STATES PATENT OFFICE.

HOWARD G. SHORTT, OF CARTHAGE, NEW YORK, ASSIGNOR OF ONE-HALF TO STEBBINS ENGINEERING AND MANUFACTURING COMPANY, OF WATERTOWN, NEW YORK, A CORPORATION OF NEW YORK.

STEAM TRAP.

Application filed May 10, 1927. Serial No. 190,218.

My present invention relates to certain new and useful improvements in steam traps, having unique mechanical features of value and effectiveness, among which the chief is a ball valve with means for automatically shifting the position of the same to open and close a discharge outlet; as also the invention includes other details of construction and operation which enable the device to be very successfully used with various fluids and the like, particularly condensed steam and other condensates.

In the accompanying drawing illustrating my invention:

Figure 1 is a vertical section of my improved steam trap.

Figure 2 is a detail sectional view, partly in elevation, on the line 2, 2, of Figure 1.

The main body A of the trap may be of any shape and size, and designed to contain any kind of fluid or liquid, as for example, condensed steam or any condensate or condensates, and to receive same it may be appropriately located with convenient reference to some source of such material or substance. This body A has an inlet $a$, an air vent 14, a blow off opening 15, a discharge outlet 7, and any other necessary characteristics to make the body or tank function in all desired ways. Said body moreover has an opening to give access to the interior mechanism, which opening is securely closed by the cover B with bolts $b$ holding same. As the condensate or other substance enters body A through inlet opening $a$, the float C rises on the surface of the condensate as it fills the body A, and falls as the condensate is discharged.

The float C is carried on an arm or lever $c$, which is fulcrumed on a horizontal pin 1, that is supported in the upper ends of a pair of uprights 10, 10, that are formed as part of a block or casting 4, whose lower end is screwed-threaded and is screwed into the bottom portion of body A, contiguous to a chamber or passage 6 in bottom wall 8 that forms part of body A, said passage 6 having a discharge outlet 7, through which the condensate is allowed to flow out of body A. The fulcrum end of rod $c$ which swings on pin 1 is broadened and formed with a ledge 11 acting as a stop adapted to strike against a pair of stops 12, 12, that project from the bearings of the pin 1 on the upper ends of uprights 10, 10.

The enlarged or broadened end of arm or lever $c$ is shaped with an inverted cup or semi-globular member 9 that loosely embraces a ball valve 2, preferably of bronze, and the movement of the arm $c$ on its fulcrum moves the cup 9 correspondingly and causes the ball 2 to move back and forth, forcing the same by a rolling movement.

The ball valve 2 controls the mouth of a discharge port 13 in seat 5 at the upper end of casting 4. This casting has a passage 3 running through it from port 13 to the lower chamber or passage 6. The action of cup 9 on ball 2 rolls the same at one time over the port 13 and closes it as shown in full lines in Figure 1; and at another time rolls it away from port 13 and opens the latter, more or less as shown in dotted lines in Figure 1. When the port 13 is open the contents of body A will pass in greater or less quantity depending upon the degree of opening from the interior of said body through this port, then through passage 3 into chamber or passage 6, and out through the nozzle connection 7 to any desired point, providing the static head is not more than the pressure in the unit being drained, as body A is working at all times under the pressure in the unit being drained. Hence it will be understood that when the condensate enters body A, the float C will rise, and this will move cup 9 which embraces ball 2 so as to roll the ball off the discharge port 13, that is the ball will roll along on the seat 5 and off the port, opening the same more or less, so that the condensate flows out of the trap through outlet 7.

As the condensate is thus discharging from body A the float C settles down as the level of the liquid drops, and this action brings the opposite side of cup 9, which may be wider at 19, in contact with the other side of ball 2, rolling same back to its position over port 13, closing the said port more or less, or wholly at times. This travel of the cup and consequently of the ball is regulated and limited by the contact of stop 11 with stops 12, at which time the float C will be in the bottom of the body A and the latter discharged quite fully of its contents. It will be noted that there is sufficient clearance between cup 9 and ball valve 2 to permit easy action, and allow the ball 2 to be free to find its seat when the stops 11 and 12 are together.

The operation of the trap will be clearly evident from the foregoing description of the construction and arrangement of the parts without the need of additional detail.

The device may obviously be extensively applied to steam apparatus and to other forms of mechanism where a trap may be utilized. The essential feature obviously is the ball valve, and in combination therewith as an active mechanical member a cup-shaped member automatically actuated by a float and loosely engaging the ball so as to force the same by a rolling movement away from and then back to a discharge port, thus opening and closing said discharge. There may be many changes made in the device and its parts and their combination, and in the materials, dimensions, shape and operative relations of the parts, within the scope of the claims and without exceeding the limits of the invention.

Obviously the ball valve is the leading feature. It is the principal moving part, and is controlled by the float. The water level is indicated in dotted lines. As the float rises and falls, according to the quantity of condensation coming to the trap, the flow from the trap is regulated accordingly. There is no air binding, for the air is taken care of. There is no steam leakage, because there is a substantial water seal between the outlet and the steam. As the water level drops, the ball closes the outlet in an effective way at all times that this is necessary.

What I claim, is:

1. In a device of the class described, the combination with a body having an inlet and an outlet, of a ball valve for the outlet, a float on the liquid in the body, a lever attached to the float, a fulcrum on which the lever swings as the float rises and falls, a cup-shaped member carried by the lever and loosely embracing the ball valve, to roll the same off and on the outlet, and stop means on the cup member and the fulcrum, which acts to limit the movement of the lever and float.

2. In a trap, the combination of a body having an inlet opening and a discharge passage, a removable member having a central port and a top valve seat, said port entering the discharge passage, said member having uprights carrying a pivot pin, and having stops, a ball valve rolling on the seat off and on the port, a float, an arm secured thereto and mounted on the pivot to swing thereon, said arm having a cup that engages the ball and a stop projection that engages the other stop when the float is at one limit of its motion.

3. In a device of the class described, the combination with a body having an inlet and an outlet, of a ball valve for the outlet, a float on the liquid in the body, a lever attached to the float and mounted to swing on a fulcrum, and a concave member formed as an integral part of the lever closely adjacent to the fulcrum and loosely engaging the ball valve to roll the same relatively to the outlet as the float rises and falls, and stop means on the concave member and fulcrum.

4. In a device of the class described, the combination of a body having an inlet, of a removable block in the bottom of the body provided with a vertical outlet passage therethrough and a valve seat on the top, a discharge chamber into which the said outlet passage delivers, a ball movable on said valve seat to open and close the outlet passage, a float, a lever attached thereto and made integral with a cup-shaped member whose concave interior loosely engages the ball, and fulcrum means for pivotally supporting the cup carrying end of the lever.

5. In a device of the class described, the combination with a body having an inlet, an outlet, an air vent, and a blow-off opening, of a float, an arm attached thereto and provided with a concave member, a ball valve loosely engaged by the concave member, a fulcrum for said arm, a valve seat arranged in conjunction with the outlet, in relation to which seat the ball valve rolls to close and open the outlet, and stop means on the concave member and the fulcrum to limit the movement of the arm and the float.

6. In a trap, the combination of a body having an inlet, an outlet, an air vent, and a blow-off, a passaged block near the outlet, said block having a valve seat, a free ball valve on said seat, a cup loosely engaging said ball, lever means integral with the cup, a fulcrum for said lever means, a float connected to and actuating the lever means, and stop means on the cup and on the fulcrum of the lever to limit the movement of the lever and float.

In testimony whereof I hereunto affix my signature.

HOWARD G. SHORTT.